(12) United States Patent
Yokoyama et al.

(10) Patent No.: US 12,261,452 B2
(45) Date of Patent: Mar. 25, 2025

(54) POWER SUPPLY MAT, NONCONTACT POWER SUPPLY SYSTEM, AND MOVING BODY

(71) Applicant: TOYOTA JIDOSHA KABUSHIKI KAISHA, Toyota (JP)

(72) Inventors: Daiki Yokoyama, Gotemba (JP); Sungmin Cho, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 18/365,390

(22) Filed: Aug. 4, 2023

(65) Prior Publication Data

US 2024/0047997 A1 Feb. 8, 2024

(30) Foreign Application Priority Data

Aug. 5, 2022 (JP) .................. 2022-125567

(51) Int. Cl.
*H02J 50/10* (2016.01)
*G01S 3/04* (2006.01)
*G01S 11/12* (2006.01)
*H02J 50/00* (2016.01)
*H02J 50/90* (2016.01)

(52) U.S. Cl.
CPC ............. *H02J 50/10* (2016.02); *G01S 3/04* (2013.01); *G01S 11/12* (2013.01); *H02J 50/005* (2020.01); *H02J 50/90* (2016.02)

(58) Field of Classification Search
CPC ........ B60L 53/126; B60L 53/38; B60L 53/39; B60L 53/36; B60L 53/37; B60L 53/35; H02J 50/90; H02J 50/10; H02J 50/12
See application file for complete search history.

(56) References Cited

U.S. PATENT DOCUMENTS

2011/0082612 A1* 4/2011 Ichikawa ................ H02J 50/80
320/109

FOREIGN PATENT DOCUMENTS

| JP | 2014-236540 A | | 12/2014 |
| JP | 2016127660 A | * | 7/2016 |
| WO | WO 2010/052785 A1 | | 5/2010 |

* cited by examiner

*Primary Examiner* — Ryan Johnson
(74) *Attorney, Agent, or Firm* — Finnegan, Henderson, Farabow, Garrett and Dunner LLP

(57) ABSTRACT

A power supply mat includes a power transmission coil configured to transmit electric power supplied from an external power supply or internal power supply to a moving body provided with a power reception coil by noncontact, a covering sheet configured to cover the power transmission coil, and a light emitting device configured to emit light toward the outside when detecting the moving body is approaching it within a predetermined distance.

8 Claims, 4 Drawing Sheets

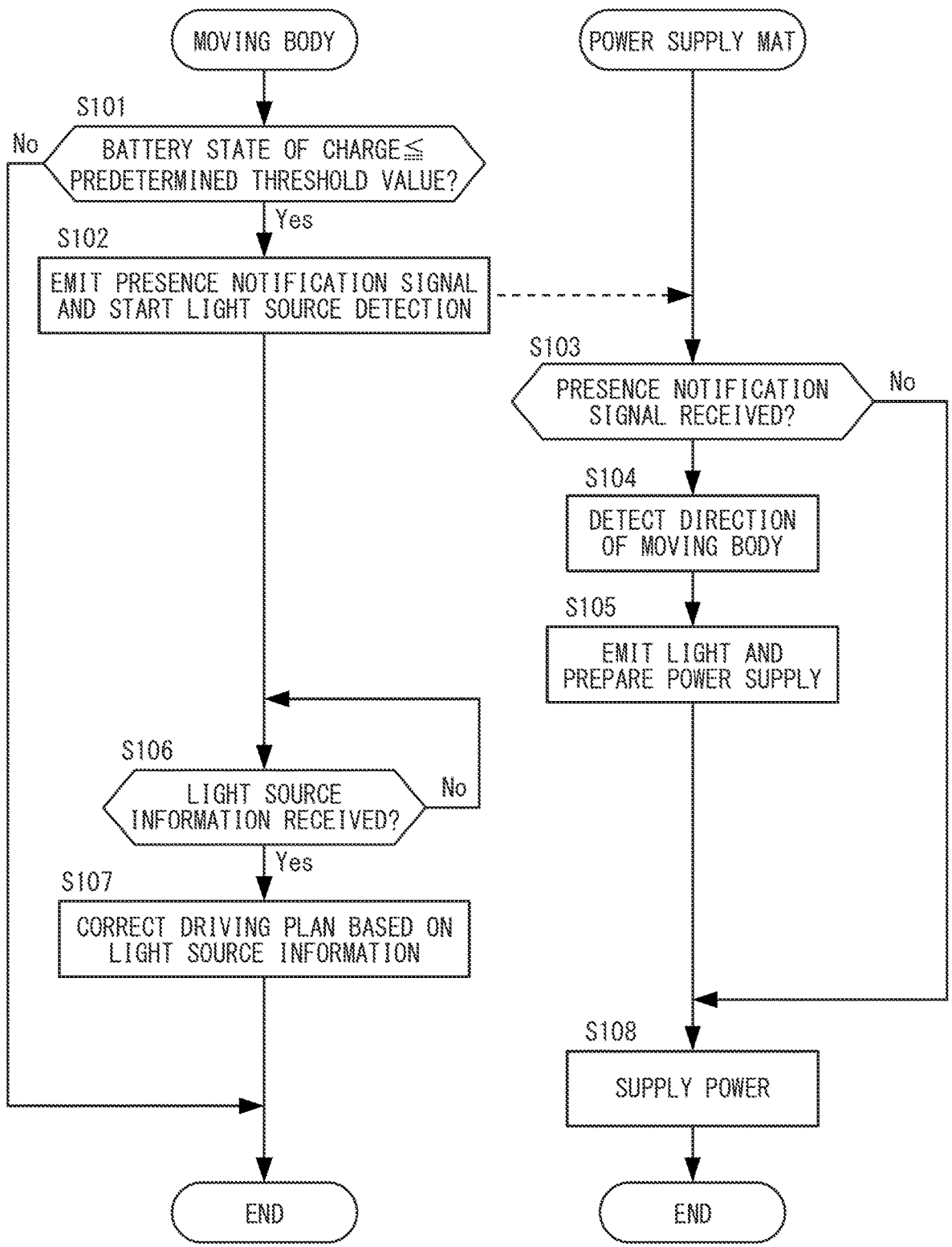

POWER SUPPLY MAT, NONCONTACT POWER SUPPLY SYSTEM, AND MOVING BODY

FIELD

The present disclosure relates to a power supply mat, noncontact power supply system, and moving body.

BACKGROUND

Japanese Unexamined Patent Publication No. 2014-236540 discloses a power supply mat arranged on a running path of a vehicle and configured to transmit electric power to the vehicle by noncontact.

SUMMARY

Unlike a power transmission device buried in a road, a power supply mat can be transported. Further, there is a high degree of freedom of the installation location. Therefore, for example, it is envisioned as being set at an event ground or evacuation site or other location at which noncontact power supply is usually not possible and being used for noncontact power supply to various moving bodies used at that location (vehicles, small sized robots, drones, etc.) For this reason, a moving body requesting noncontact power supply has to be suitably guided to the power supply mat.

The present disclosure was made focusing on such a problem and has as its object to suitably guide a moving body requesting noncontact power supply to a power supply mat.

To solve this problem, a power supply mat according to one aspect of the present disclosure comprises a power transmission coil configured to transmit electric power supplied from an external power supply or internal power supply to a moving body provided with a power reception coil by noncontact, a covering sheet configured to cover the power transmission coil, and a light emitting device configured to emit light toward the outside when detecting a moving body is approaching it within a predetermined distance.

A power supply mat according to another aspect of the present disclosure comprises a power transmission coil configured to transmit electric power supplied from an external power supply or internal power supply to a moving body provided with a power reception coil by noncontact, a covering sheet configured to cover the power transmission coil, and a light emitting device configured to emit light toward the outside when receiving a signal notifying it of the presence of the moving body from that moving body by a predetermined reception strength or more.

A moving body according to another aspect of the present disclosure comprises a wireless communication device configured to transmit a signal notifying the presence of a moving body to a power supply mat configured to enable noncontact power supply, a light source detection device configured to detect light after the signal is emitted and detect a direction of a light source of the light, and a control device configured to perform automated driving for automatically performing driving operations of the moving body. The control device is configured to correct a direction of advance of the moving body so that the direction of advance of the moving body matches the direction of the light source when the light source detection device detects the direction of the light source of the light.

According to these aspects of the present disclosure, it is possible to guide a moving body requesting noncontact power supply in the direction from which light is emitted, that is, the direction at which a power supply mat is arranged, to suitably guide the moving body to a power supply mat.

BRIEF DESCRIPTION OF DRAWINGS

FIG. 4 is a view for explaining the content and flow of processing performed at a power supply mat and moving body for guiding a moving body to a power supply mat and restoring a battery state of charge of the moving body.

DESCRIPTION OF EMBODIMENTS

Figure 1:
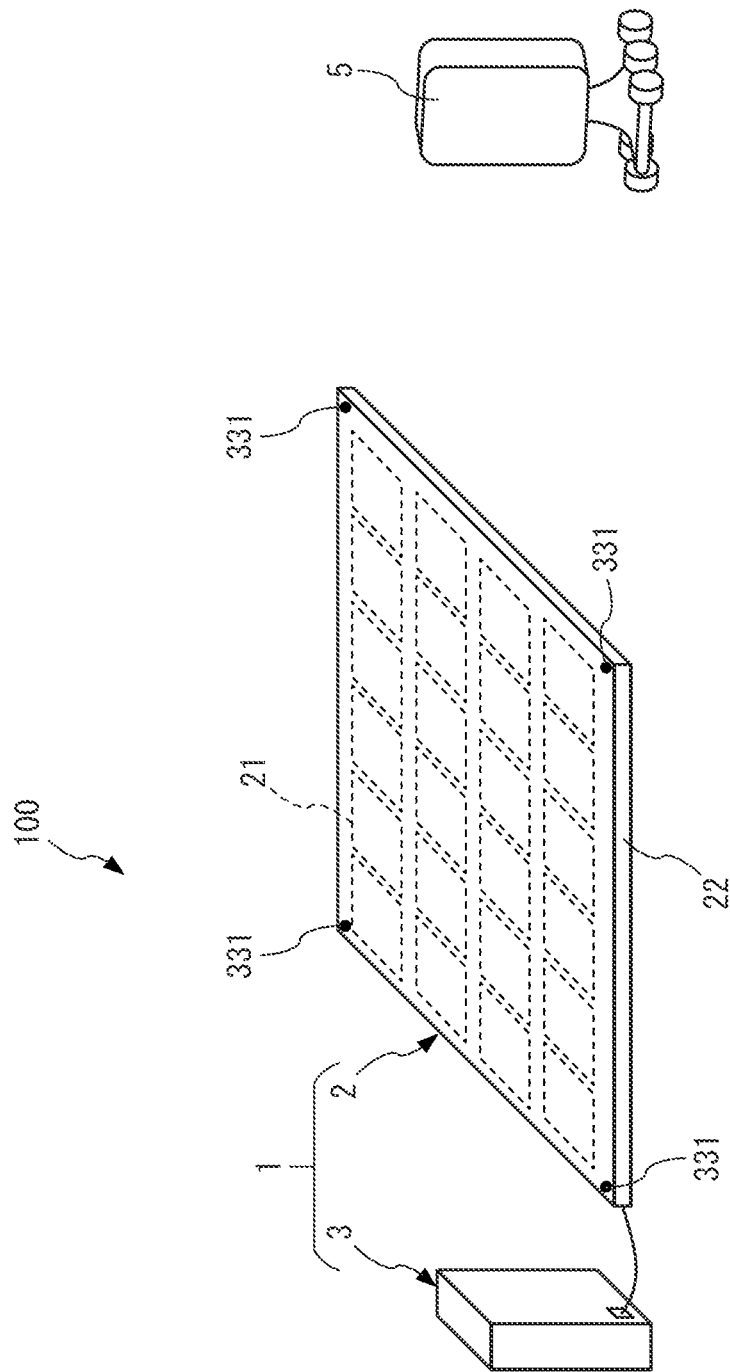
FIG. 1 is a schematic perspective view of a noncontact power supply system according to one embodiment of the present disclosure.

Below, referring to the drawings, embodiments will be explained in detail. Note that, in the following explanation, similar constituent elements will be assigned the same reference notations.

FIG. 1 is a schematic perspective view of a noncontact power supply system 100 according to one embodiment of the present disclosure.

As shown in FIG. 1, the noncontact power supply system 100 is provided with a power supply mat 1 and a moving body 5 designed for noncontact power supply. Note that, in FIG. 1, for facilitating understanding of the disclosure, the power supply mat 1 and moving body 5 are not shown by the actual ratio of their dimensions. They are shown changed in ratio as needed so that the structure etc. become clearer.

The power supply mat 1 is provided with a mat part 2 and a power supply device 3. The power supply mat 1 is a mat configured to be able to transmit electric power supplied from an external power supply or internal power supply to a moving body 5 by noncontact. The power supply mat 1, as shown in FIG. 1, can be placed on the ground or a floor. In addition, it can be attached to, for example, a wall.

The mat part 2 is provided with at least one power transmission coil 21 and a covering sheet 22.

The power transmission coil 21 supplies a moving body 5 which has moved over the mat part 2 with electric power by noncontact by, for example, magnetic field resonant coupling (magnetic field resonance). Note that the power transmission system is not limited to magnetic field resonant coupling. It may also be magnetic field coupling (electromagnetic induction), electric field coupling, electric field resonant coupling (electric field resonance), and other power transmission systems.

The covering sheet 22 is a sheet-shaped member for covering the power transmission coil 21 and has the function of protecting the power transmission coil 21. In the present embodiment, the covering sheet 22 is configured by a member having flexibility so as to enable the mat part 2 to, for example, be wound up in a roll shape or be folded. Due to this, the mat part 2 and in turn the power supply mat 1 can be easily stored or transported. Further, in the present embodiment, the covering sheet 22 covers a plurality of power transmission coils 21.

Figure 2:
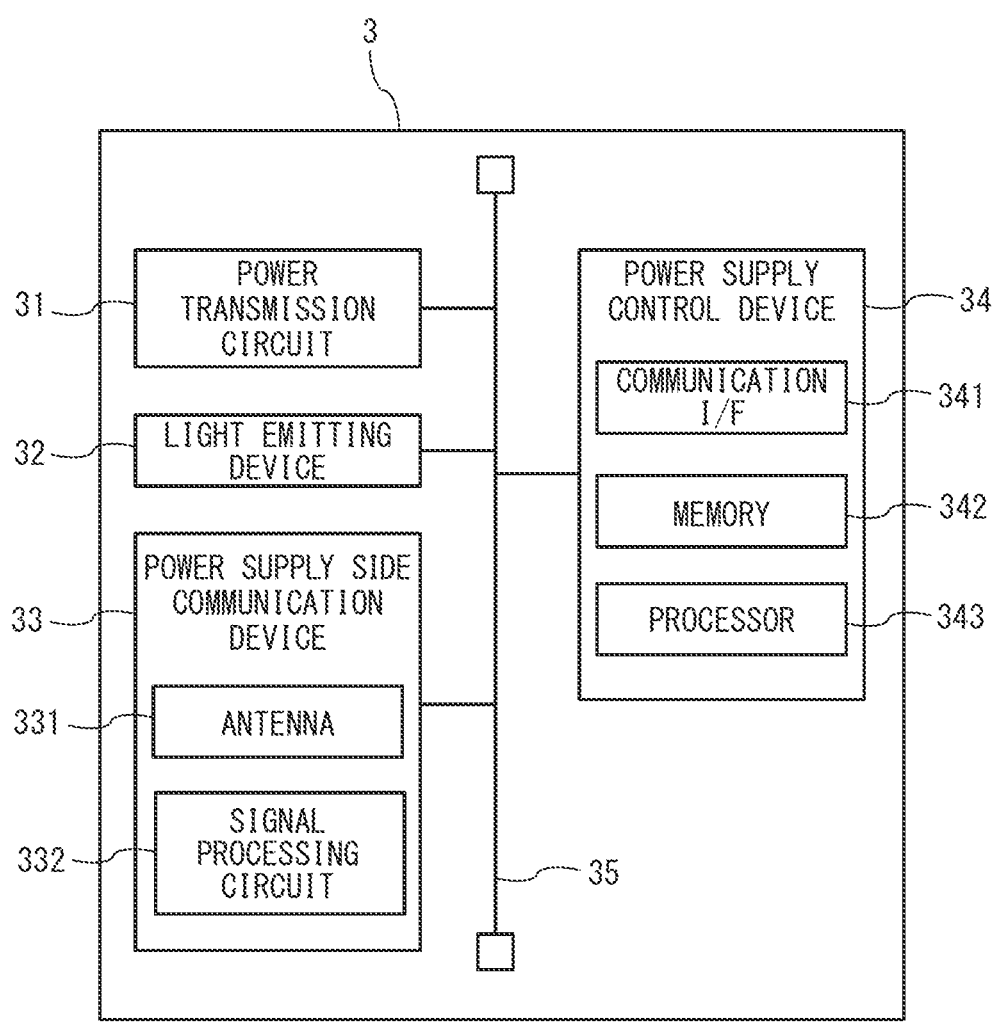
FIG. 2 is a schematic view of the system configuration of a power supply device.

FIG. 2 is a schematic view of the system configuration of a power supply device 3.

As shown in FIG. 2, the power supply device 3 is provided with a power transmission circuit 31, light emitting device 32, power supply side communication device 33, and power supply control device 34.

The power transmission circuit 31, for example, is an electric circuit which is electrically connected by an electric cable to a power outlet or other external power supply (not shown) for transmitting power of the external power supply to the power transmission coil 21. The power transmission circuit 31 is controlled by the power supply control device 34 and supplies power of the external power supply to the power transmission coil 21 so that the power transmission coil 21 of the mat part 2 and a power reception coil (not shown) mounted on the moving body 5 arranged spaced apart are magnetically coupled for noncontact power supply. Note that the power supply device 3 may also be configured so as to be provided with an internal power supply. In this case, the power of the internal power supply can be supplied, so the power supply device 3 does not have to be configured to be able to connect with an external power supply.

The light emitting device 32, for example, is comprised of an LED (light emitting diode) and is controlled by the power supply control device 34 to emit light toward the outside. In the present embodiment, the light emitting device 32 is configured so as to emit light having directivity in any direction of the surrounding 360 degrees of the mat part 2. However, the light emitting device 32 may also be configured so as to emit light in all directions of the surrounding 360 degrees of the mat part 2.

The power supply side communication device 33 is provided with at least one antenna 331 and a signal processing circuit 332 for performing various processing relating to wireless communication such as modulation and demodulation of the wireless signal. The power supply side communication device 33 has a narrow area communication function for direct wireless communication between terminals without going through a base station and is designed to be able to directly wirelessly communicate with a moving body 5 by narrow area communication. If receiving a wireless signal from the outside, the power supply side communication device 33 sends that wireless signal to the power supply control device 34. Further, if a signal for transmission to the outside is transferred from the power supply control device 34, the power supply side communication device 33 generates a wireless signal including that signal and sends it to the outside.

Note that in the present embodiment, antennas 331 of the power supply side communication device 33, as shown in FIG. 1, are arranged at the four corners of the mat part 2. Due to this, it becomes possible to detect the direction of the moving body originating the wireless signal based on a difference in the reception strengths of the wireless signal received by the antennas 331 and a difference in the reception times of the wireless signal received by the antennas 331 (time difference). For example, if a wireless signal is sent from the north side in the east, west, north, and south directions, the reception strength of the wireless signal received by the antenna 331 arranged at the north side of the mat part 2 becomes the strongest, so it is possible to detect the direction of the moving body 5 originating the wireless signal. Further, compared with the reception time of the wireless signal received at the antenna 331 arranged at the north side of the mat part 2, the reception time of the wireless signal received by the antenna 331 arranged at another position becomes later, so it is possible to use the difference in reception time to detect the direction of the moving body originating the wireless signal.

The power supply control device 34 is provided with a communication interface (communication I/F) 341, memory 342, and processor 343.

The communication interface 341 is provided with an interface circuit for connecting the power supply control device 34 to an internal network 35 of the power supply device 3. The power supply control device 34 is connected through this communication interface 341 with the power transmission circuit 31, light emitting device 32, power supply side communication device 33, etc.

The memory 342 has an HDD (hard disk drive) or optical recording medium, semiconductor memory, or other storage medium. The memory 342 stores various computer programs and data etc. used at the processor 343. Further, the memory 342 stores data generated by the computer programs, data received through the communication interface 341, etc.

The processor 343 is provided with one or more CPUs (central processing units) and their peripheral circuits. The processor 343 performs various processing based on various computer programs stored in the memory 342 to comprehensively control the operation of the power supply mat 1. This content of the processing for guiding the moving body 5 to the power supply mat 1 performed by the processor 343 and in turn the power supply control device 34 will be explained later referring to FIG. 4.

Returning to FIG. 1, the moving body 5 is for example a vehicle, small size robot, drone, etc. designed for noncontact power supply. FIG. 1 illustrates, as an example of the moving body 5, a micropallet able to autonomously run. Below, referring to FIG. 3, details of the moving body 5 will be explained.

Figure 3:
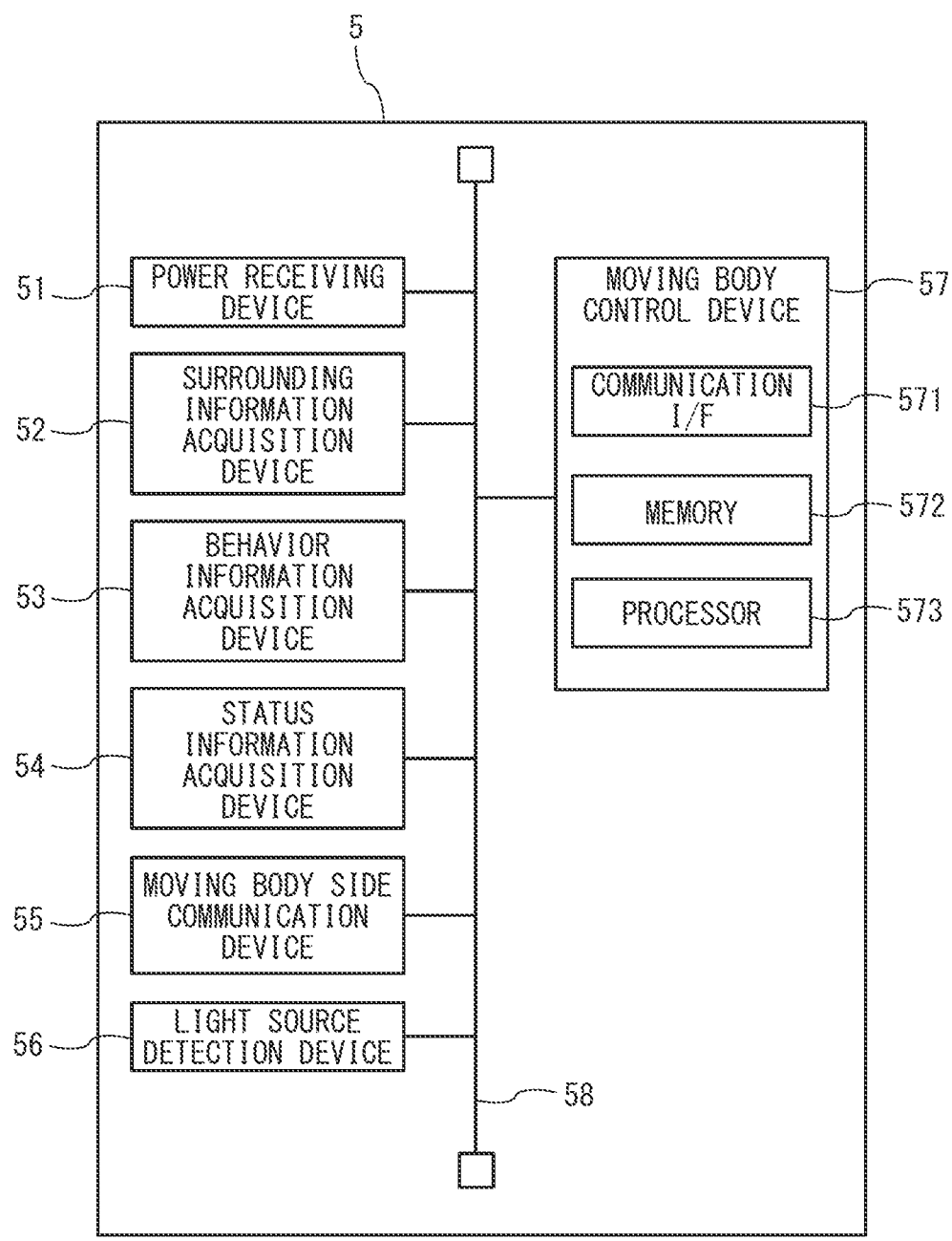
FIG. 3 is a schematic view of the system configuration of a moving body.

FIG. 3 is a schematic view of the system configuration of the moving body 5.

The moving body 5 is provided with a power receiving device 51, surrounding information acquisition device 52, behavior information acquisition device 53, status information acquisition device 54, moving body side communication device 55, light source detection device 56, and moving body control device 57.

The power receiving device 51 is provided with a power reception coil (not shown). The power receiving device 51 is configured to be controlled by the moving body control device 57 and to supply electric power received from the power supply mat 1 to an electric load mounted in the moving body 5. As the electric load, for example, a battery, a motor, etc. for driving the moving body can be mentioned.

The surrounding information acquisition device 52 is a device for acquiring data of objects in the surroundings of the moving body 5 as surrounding information of the moving body 5. The surrounding information acquisition device 52 can be configured from one or more pieces of equipment. In the present embodiment, it is configured from a camera capturing the surroundings of the moving body 5, a distance measurement sensor for measuring the distance up to objects in the surroundings of the moving body 5, etc. (for example, LIDAR (light detection and ranging device), millimeter wave radar sensor, ultrasonic sensor, etc.) etc. The surrounding information of the moving body 5 acquired by the surrounding information acquisition device 52 is sent through the internal network 58 of the moving body 5 to the moving body control device 57.

The behavior information acquisition device 53 is a device for acquiring various parameters showing the behavior of the moving body 5 as behavior information of the moving body 5. The behavior information acquisition device 53 can be comprised of one or more pieces of equipment. In the present embodiment, it is comprised of a speed sensor, acceleration sensor, steering angle sensor, etc. The speed, acceleration, steering angle, and other behavior information of the moving body 5 acquired by the behavior information acquisition device 53 is sent through the internal network 58 of the moving body 5 to the moving body control device 57.

The status information acquisition device 54 is a device for acquiring various parameters showing the status of the moving body 5 as status information of the moving body 5. The status information acquisition device 54 can be comprised of one or more pieces of equipment. In the present embodiment, it is comprised of a GNSS receiver for detecting the current position of the moving body 5 based on the various satellite waves received from aa plurality of satellites and an SOC sensor for detecting the state of charge of the battery for driving the moving body (below, referred to as the "battery state of charge") [%]. The current position and battery state of charge and other status information of the moving body 5 acquired by the status information acquisition device 54 is sent through the internal network 58 of the moving body 5 to the moving body control device 57.

The moving body side communication device 55 is provided with an antenna and a signal processing circuit for executing various processing relating to wireless communication such as modulation and demodulation of the wireless signal. The moving body side communication device 55, in the same way as the power supply side communication device 33, has a narrow area communication function and is designed to directly wirelessly communicate with the moving body 5 by narrow area communication. If receiving a wireless signal from the outside, the moving body side communication device 55 sends that wireless signal to the moving body control device 57. Further, if a signal for transmission to the outside is transferred from the moving body control device 57, the moving body side communication device 55 generates a wireless signal including that signal and outputs it to the outside.

The light source detection device 56 is a device which detects light which the light emitting device 32 of the power supply mat 1 emits and detects the direction (orientation) of the light emitting device 32 and in turn the power supply mat 1. If detecting light which the light emitting device 32 of the power supply mat 1 emits, the light source detection device 56 detects the direction of the light emitting device 32 (light source) and sends this as light source information through the internal network 58 to the moving body control device 57.

The light source detection device 56 according to the present embodiment is provided with a camera and detects a direction of the light emitting device 32 of the power supply mat 1 based on a camera image captured by that camera. Specifically, the light source detection device 56 inputs a camera image to a deep neural network or other discriminator trained in accordance with a learning technique called "error backpropagation" using a large number of teacher images so as to detect the direction of the light emitting device 32 of the power supply mat 1. Note that the camera image does not have to be captured by a dedicated camera and may be acquired from the camera of the surrounding information acquisition device 52.

The moving body control device 57 is provided with a communication interface (wireless I/F) 571, a memory 572, and a processor 573.

The communication interface 571 is provided with an interface circuit for connecting the moving body control device 57 to an internal network 58. The moving body control device 57 is connected through this communication interface 571 to a power receiving device 51, surrounding information acquisition device 52, behavior information acquisition device 53, status information acquisition device 54, moving body side communication device 55, light source detection device 56, and various other equipment mounted in the moving body 5.

The memory 572 has an HDD (hard disk drive) or optical recording medium, semiconductor memory, or other storage medium. The memory 572 stores various computer programs and data etc. used for processing at the processor 573. Further, the memory 572 stores data generated by the computer programs, data received through the communication interface 571 from various equipment mounted at the moving body 5, etc.

The processor 573 is provided with one or more CPUs (central processing units) and their peripheral circuits. The processor 573 performs various processing based on various computer programs stored in the memory 572 to comprehensively control the operation of the moving body 5. For example, the processor 573 prepares a driving plan of the moving body 5 based on the surrounding information, behavior information, status information, etc. and performs automating driving for automatically performing driving operations relating to acceleration, steering, and braking in accordance with the driving plan. Further, the processor 343 performs processing for restoring the battery state of charge when the battery state of charge of the moving body 5 has fallen.

Here, as explained above, unlike a power transmission device buried in a road for noncontact power supply, the power supply mat 1 can be transported. Further, there is a high degree of freedom of the installation location, so, for example, it is envisioned as being set at an event ground or evacuation site or other location at which noncontact power supply is usually not possible and being used for noncontact power supply to a moving body 5 used at that location. For this reason, a moving body 5 requesting noncontact power supply has to be suitably guided to the power supply mat 1 to be supplied with power.

FIG. 4 is a view for explaining the content and flow of processing performed at a power supply mat 1 and moving body 5 for guiding the moving body 5 to a power supply mat 1 and restoring a battery state of charge of the moving body 5.

At step S101, the moving body control device 57 judges if the battery state of charge of the moving body 5 is a predetermined threshold value or less. The predetermined threshold value can be made a battery state of charge suitable for starting processing for restoring the battery state of charge of the moving body 5 and can be set to any suitable value according to the usage environment of the moving body 5. If the battery state of charge of the moving body 5 is the predetermined threshold value or less, the moving body control device 57 proceeds to the processing of step S102. On the other hand, if the battery state of charge of the moving body 5 is higher than the predetermined threshold value, the moving body control device 57 ends the current processing.

At step S102, the moving body control device 57 starts periodically emitting a wireless signal through the moving body side communication device 55 for notifying the presence of the moving body 5 to the power supply mat 1 (below, referred to as the "presence notification signal" and starts detecting a light source by the light source detection device 56. The presence notification signal, for example, may also be transmitted toward the entire surroundings in the direction of advance of the moving body 5 (direction of destination).

At step S103, the power supply control device 34 judges if there is a moving body 5 desiring noncontact power supply present within a predetermined distance from the power supply mat 1. In the present embodiment, if any of the antennas 331 arranged at the four corners of the mat part 2 has received a presence notification signal by a predetermined reception strength or more, the power supply control device 34 judges that there is a moving body 5 desiring noncontact power supply within a predetermined distance from the power supply mat 1 and proceeds to the processing of step S104. On the other hand, if none of the antennas 331 has received a presence notification signal by the predetermined reception strength or more, the power supply control device 34 judges that there is no moving body 5 desiring noncontact power supply present within a predetermined distance from the power supply mat 1 and ends the current processing.

At step S104, the power supply control device 34 detects the direction of the moving body 5 originating the presence notification signal based on a difference in the reception strengths of the presence notification signal received by the antennas 331 and a difference in the reception times of the wireless signal received by the antennas 331 (time difference).

At step S105, the power supply control device 34 controls the light emitting device 32 to emit light toward the direction of the moving body 5 so as to guide the moving body 5 to the power supply mat 1 and controls the power transmission circuit 31 to prepare for power supply so as to be able to supply power to the moving body 5 when the moving body 5 has moved to the mat part 2 of the power supply mat 1. Note that in the present embodiment, in this way, the light emission by the light emitting device 32 and preparation for power supply are performed simultaneously, but the preparation for power supply may be performed within a predetermined time period before and after light emission by the light emitting device 32. Therefore, for example, it is also possible prepare for power supply after the elapse of a predetermined time from light emission after the presence notification signal has been received by the predetermined reception strength or more. Conversely, it is also possible to emit light after the elapse of a predetermined time from preparation for power supply after the presence notification signal has been received by the predetermined reception strength or more.

At step S106, the moving body control device 57 judges if it has received light source information from the light source detection device 56. If receiving light source information from the light source detection device 56, the moving body control device 57 proceeds to the processing of step S107. On the other hand, if not receiving light source information from the light source detection device 56, the moving body control device 57 again performs the processing of step S106 after waiting for a predetermined time.

At step S107, the moving body control device 57 calculates the deviation angle between the direction of advance the moving body 5 and the direction of the light emitting device 32 based on the light source information and corrects the driving plan so that the direction of advance the moving body 5 matches the direction of the light emitting device 32. Due to this, the moving body 5 can be suitably guided toward the mat part 2 of the power supply mat 1, so it is possible to reliably supply power to the moving body 5 by the power supply mat 1.

At step S108, if the moving body 5 moves to the mat part 2, the power supply control device 34 supplies power to the moving body 5 by noncontact.

The power supply mat 1 according to the present embodiment explained above is provided with a power transmission coil 21 for transmitting electric power supplied from an external power supply or internal power supply to a moving body 5 provided with a power reception coil by noncontact, a covering sheet 22 for covering the power transmission coil 21, and a light emitting device 32 emitting light toward the outside when it is detected that a moving body 5 has approached it within a predetermined distance.

Specifically, the light emitting device 32 is configured to detect the fact of the moving body 5 approaching within a predetermined distance based on a presence notification signal notifying the presence of the moving body 5 received from the moving body 5. In the present embodiment, it is configured so as to judge that the moving body 5 has approached within a predetermined distance and emit light toward the outside when receiving a presence notification signal from the moving body 5 by a predetermined reception strength or more.

Due to this, it is possible to guide a moving body 5 requesting noncontact power supply in the direction from which light is emitted, that is, the direction at which a power supply mat 1 is arranged, and suitably guide the moving body 5 to the power supply mat 1.

Further, in the present embodiment, a plurality of antennas 331 are attached at different positions of the covering sheet 22. The light emitting device 32 is configured to emit light toward the direction of the moving body 5 originating the presence notification signal detected based on a difference in the reception strengths of the presence notification signal received by the antennas 331 or a difference in the reception times of the presence notification signal received by the antennas.

Further, the moving body 5 according to the present embodiment is provided with a moving body side communication device 55 (wireless communication device) for transmitting a presence notification signal for notifying the presence of the moving body 5 to a power supply mat 1 enabling noncontact power supply, a light source detection device 56 for detecting light emitted after the presence notification signal has been transmitted and detecting a direction of a light source of that light, and a moving body control device 57 (control device) for automated driving for automatically performing operations for driving the moving body 5. Further, the moving body control device 57 is configured so as to correct a direction of advance the moving body 5 to match a direction of advance of the moving body 5 when the light source detection device 56 detects the direction of the light source of that light. Further, the noncontact power supply system 100 is configured by such a moving body 5 and power supply mat 1.

Due to this, it is possible to reliably guide a moving body 5 requesting noncontact power supply to a power supply mat 1 and reliably supply power to the moving body 5 by the power supply mat 1.

Above, embodiments of the present disclosure were explained, but the above embodiments only show some of the examples of application of the present disclosure and are not intended to limit the technical scope of the present disclosure to the specific constitutions of the embodiments.

The invention claimed is:
1. A power supply mat comprising:
   a power transmission coil configured to transmit electric power supplied from an external power supply or internal power supply to a moving body provided with a power reception coil by noncontact;

a covering sheet configured to cover the power transmission coil;

a light emitting device configured to emit light when detecting the moving body is approaching the light emitting device within a predetermined distance; and a plurality of antennas attached to the covering sheet at different attachment positions, the light emitting device configured to emit light toward a direction of the moving body originating a signal detected based on a difference of reception strengths of the signal received by the antennas or a difference of reception times of the signal received by the antennas.

2. The power supply mat according to claim 1, wherein the light emitting device is configured to detect that the moving body has approached the light emitting device within a predetermined distance based on a signal notifying the presence of the moving body received from the moving body.

3. A power supply mat comprising:

a power transmission coil configured to transmit electric power supplied from an external power supply or internal power supply to a moving body provided with a power reception coil by noncontact;

a covering sheet configured to cover the power transmission coil;

a light emitting device configured to emit light toward the outside when receiving a signal notifying the light emitting device of the presence of the moving body from the moving body by a predetermined reception strength or more; and a plurality of antennas attached to the covering sheet at different attachment positions, the light emitting device configured to emit light toward a direction of the moving body originating the signal detected based on a difference of reception strengths of the signal received by the antennas or a difference of reception times of the signal received by the antennas.

4. The power supply mat according to claim 3, wherein the power supply mat is configured to synchronize power supply to the power transmission coil synchronized with the timing for generating light by the light emitting device or at a predetermined timing before or after the timing for generating light.

5. The power supply mat according to claim 3, wherein the power supply mat is configured to emit light by the light emitting device and prepare for power supply to the power transmission coil simultaneously when receiving the signal by a predetermined reception strength or more.

6. The power supply mat according to claim 3, wherein the power supply mat is configured to emit light by the light emitting device, then prepare for power supply to the power transmission coil when receiving the signal by a predetermined reception strength or more.

7. The power supply mat according to claim 3, wherein the power supply mat is configured to prepare for power supply to the power transmission coil, and then emit light by the light emitting device when receiving the signal by a predetermined reception strength or more.

8. A noncontact power supply system comprising:

a power supply mat according to claim 1 and a moving body, the power supply mat comprising:

a power transmission coil configured to transmit electric power supplied from an external power supply or internal power supply to the moving body provided with a power reception coil by noncontact, a covering sheet configured to cover the power transmission coil, and a light emitting device configured to emit light when detecting the moving body is approaching the light emitting device within a predetermined distance, and the moving body comprising:

a wireless communication device configured to transmit a signal notifying the power supply mat of the presence of the moving body, a light source detection device configured to detect light emitted after the signal is emitted and detect a direction of a light source of the light, and a control device configured to perform automated driving for automatically performing driving operations of the moving body, wherein the control device is configured to correct a direction of advance of the moving body so that the direction of advance of the moving body matches the direction of the light source when the light source detection device detects the direction of the light source of that light.

* * * * *